(12) United States Patent
Pilone

(10) Patent No.: US 6,976,789 B2
(45) Date of Patent: Dec. 20, 2005

(54) DEVICE FOR SUPPLYING PRESSURIZED AIR THROUGH THE HUB TO THE TIRE OF A MOTOR VEHICLE WHEEL

(75) Inventor: Simona Pilone, Rivoli (IT)

(73) Assignee: SKF Industrie S.p.A., Turin (IT)

( * ) Notice: Subject to any disclaimer, the term of this patent is extended or adjusted under 35 U.S.C. 154(b) by 89 days.

(21) Appl. No.: 10/717,828

(22) Filed: Nov. 20, 2003

(65) Prior Publication Data
US 2005/0053317 A1 Mar. 10, 2005

(51) Int. Cl.⁷ .................... F16C 33/76; B60C 23/00
(52) U.S. Cl. .................. 384/486; 384/448; 152/417
(58) Field of Search ............... 384/477, 480, 384/484, 486, 544, 589, 448; 152/417

(56) References Cited

U.S. PATENT DOCUMENTS

| 4,844,138 A | | 7/1989 | Kokubu | |
|---|---|---|---|---|
| 5,067,732 A | * | 11/1991 | Szabo et al. | 384/484 |
| 5,080,156 A | | 1/1992 | Bartos | |
| 5,221,381 A | | 6/1993 | Hurrell, II | |
| 5,253,688 A | * | 10/1993 | Tigges | 152/417 |
| 5,503,480 A | | 4/1996 | Caillaut et al. | |
| 5,979,526 A | * | 11/1999 | Chamoy | 152/417 |
| 6,283,186 B1 | * | 9/2001 | Krisher | 152/417 |
| 6,315,457 B1 | * | 11/2001 | Kapaan et al. | 384/544 |
| 6,325,123 B1 | * | 12/2001 | Gao et al. | 152/416 |

FOREIGN PATENT DOCUMENTS

| DE | 3738529 | 10/1988 |
|---|---|---|
| EP | 0 208 540 | 1/1987 |
| EP | 0 521 719 | 1/1993 |
| EP | 0 656 267 | 6/1995 |
| EP | 0 713 021 | 5/1996 |
| FR | 2 714 943 | 7/1995 |
| GB | 2 223 207 | 4/1990 |

* cited by examiner

Primary Examiner—Thomas R. Hannon
(74) Attorney, Agent, or Firm—Merchant & Gould P.C.

(57) ABSTRACT

The device (B) comprises a first non-rotatable ring (11) to be mounted adjacent to a non-rotatable race (1) of a bearing unit (A), and a second rotatable ring (12) to be coupled fast for rotation with a rotatable race (2,3) of the bearing unit (A). A first air passage (13, 113) is formed through the first non-rotatable ring (11) and a second air passage (14) is formed through the second rotatable ring (12). A sealing device (15, 16) interposed between the first (11) and the second (12) ring, defines an intermediate chamber (17) communicating with the first (13, 113) and the second (14) air passages.

18 Claims, 2 Drawing Sheets

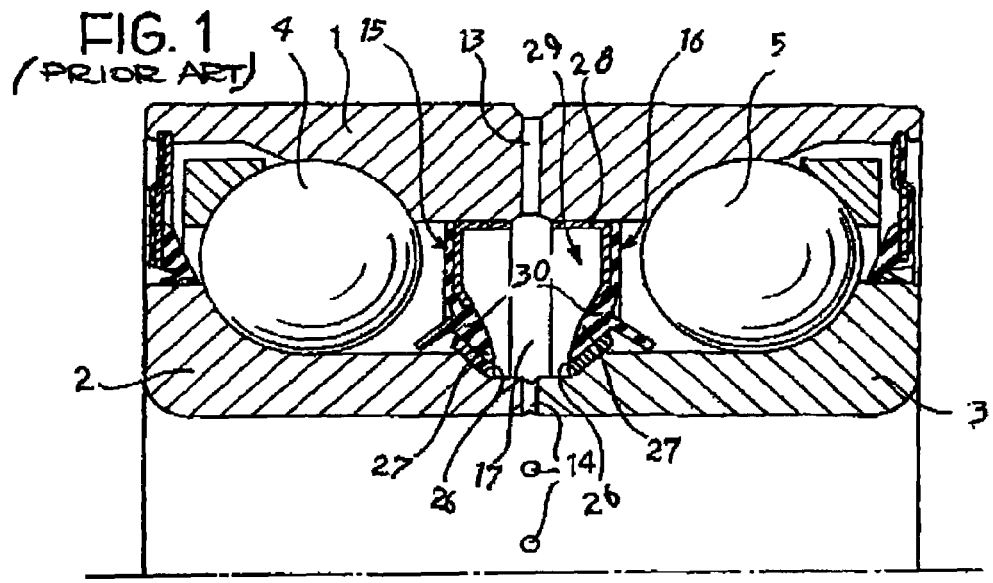
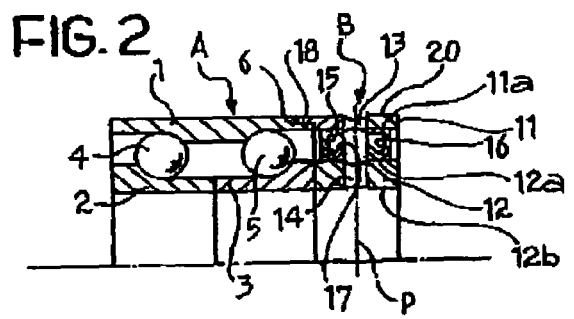
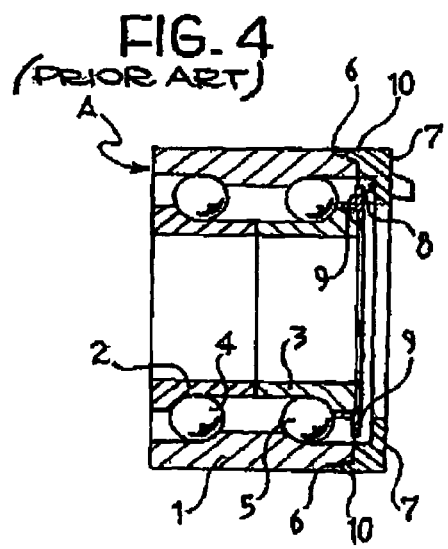
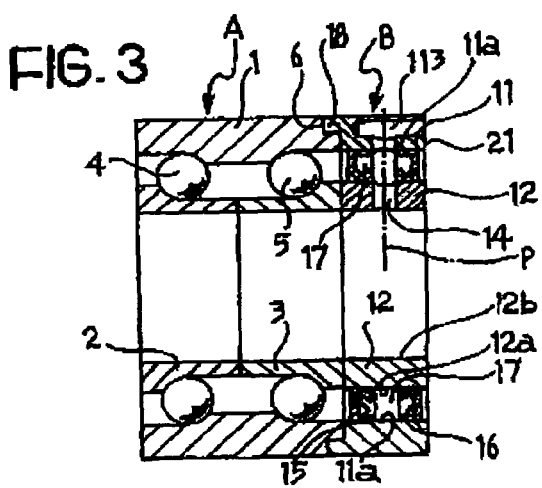

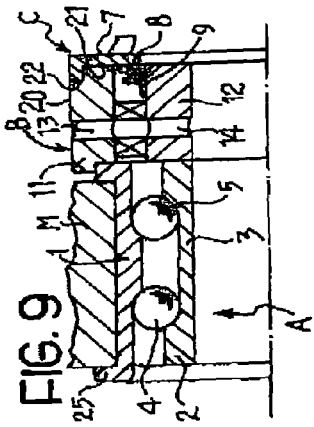
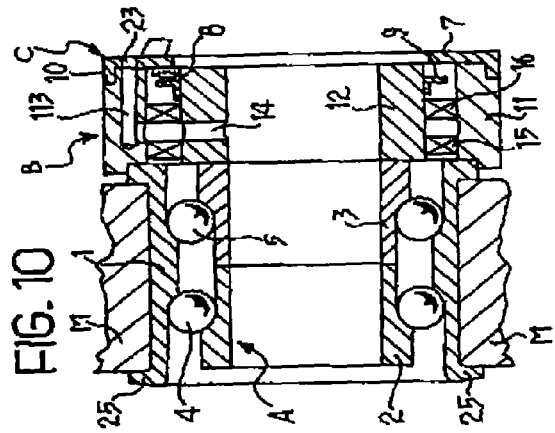
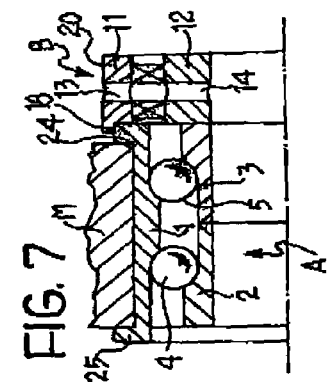
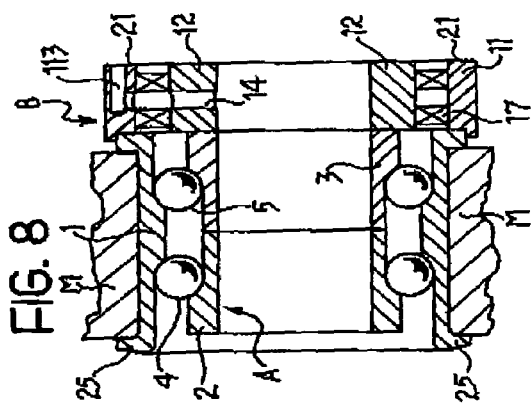
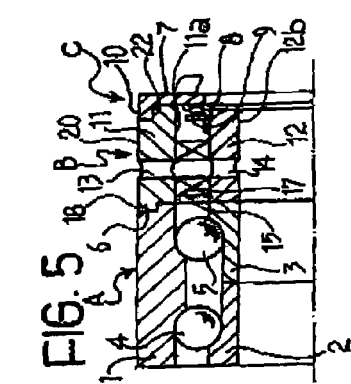

DEVICE FOR SUPPLYING PRESSURIZED AIR THROUGH THE HUB TO THE TIRE OF A MOTOR VEHICLE WHEEL

The present invention refers to a device for supplying pressurized air to the tire of a vehicle wheel through the wheel hub. The invention further refers to a bearing assembly for the hub of a vehicle wheel equipped with such a device.

There are known bearing units for a vehicle wheel hub provided with special vents and sealing devices for inflating into the tire air pressurized by means of a source of a pressurized air mounted on board of the vehicle. This solution allow to adjust and/or monitor the air pressure of the tires.

For a better understanding of the state of the art and problems inherent thereto, there will be at first described a bearing unit of the above mentioned type, with reference to FIG. 1 of the accompanying drawings. A bearing unit of this kind is known, for example, from EP-713 021, EP-656 267, U.S. Pat. No. 5,503,480, DE-37 38 529, FR-2 714 943.

In FIG. 1, a bearing unit comprises an outer race 1, an inner race 2,3 formed by two axially adjacent half-races, and two sets of bearing balls 4,5. In a radial plane located between the two sets of balls 4,5 there are several outer radial ducts 13 passing through the bearing outer race 1, and several inner radial passages 14 formed through the bearing inner race 2,3.

Mounted in the annular space defined by the outer race 1, the inner race 2,3 and the two sets of balls 4,5 is a sealing device 29 that allows pressurized air to pass through the outer 13 and inner 14 ducts of the bearing. The sealing device is constituted by two annular sealing members 15,16 facing one another axially and disposed symmetrically with respect to the radial plane in which the ducts 13 and 14 of the bearing unit lie. Each sealing element 9 15,16 generally comprises a metal reinforcement on which there is molded a flexible material, such as an elastomeric material. The metal reinforcement is formed by a sheet metal bent so as to have a portion 28 that is axially fixed to the outer race 1 of the bearing and a radial portion for stiffening the flexible material molded thereon that extends to form a flexible wall 30. The free end of the wall 30 is constituted by a lip 27, preferably of a low friction material such as Teflon™, that slidingly contacts a contact surface 26 formed by the inner race 2,3 of the bearing. The two sealing elements 15,16 so arranged delimit an intermediate annular chamber 17. Air pressurized by a pressurized air source mounted on board of the vehicle, which may be part of an automatic system or a system controlled by the driver, passes through special ducts obtained in the suspension standard of the wheel where the bearing is housed, passes through the outer ducts 13, in the intermediate annular chamber 17, through the inner ducts 14, and from here is conveyed through other ducts to the wheel rim and finally the tire.

The object of the present invention is to allow to inflate pressurized air to the wheel tire through the hub, without having to form conventional radial bores in the inner and outer races of the bearing. On the one hand, forming such bores involves a constructional complication which may adversely affect the bearing raceways, which, as known have very low admissible tolerances. On the other hand, pressurized air passing through the bearing may considerably shorten its life, should the sealing devices delimiting the above describe intermediate annular chamber be faulty.

This and other objects and advantages, that will be better understood in the following, are accomplished according to the invention by a device and a bearing assembly having the features defined in the appended claims.

There will now be described the constructional and functional features of a few preferred but not limiting embodiments of the device and the bearing assembly according to the invention. Reference is made to the accompanying drawings, in which:

FIG. 1 is an axial cross-sectional view of a bearing unit of known kind through which there are formed passages for pressurized air;

FIG. 2 is a schematic and partial cross-sectional view of a first embodiment of a bearing assembly equipped with a device according to the invention;

FIG. 3 is a schematic axial cross-sectional view of a second embodiment of a bearing assembly with a device according to the invention;

FIG. 4 is a schematic axial cross-sectional view of a conventional bearing assembly equipped with a device for detecting relative speed of rotation between the bearing races;

FIG. 5 is a partial and schematic axial cross-sectional view of a third embodiment of a bearing assembly equipped with a device according to the invention;

FIG. 6 is a schematic axial cross-sectional view of a fourth embodiment of a bearing assembly equipped with a device according to the invention;

FIG. 7 is a partial and schematic cross-sectional view of a fifth embodiment of a bearing assembly equipped with a device according to the invention;

FIG. 8 is a schematic axial cross-sectional view of a fifth embodiment of a bearing assembly equipped with a device according to the present invention;

FIG. 9 is a partial and schematic axial cross-sectional view of a seventh embodiment of a bearing assembly equipped with a device according to the present invention; and FIG. 10 is a schematic axial cross-sectional view of an eighth embodiment of a bearing assembly equipped with a device according to the present invention.

Referring to FIGS. 2 and 3, a bearing unit indicated overall A comprises a stationary outer race 1, a pair of rotatable inner races 2 and 3 sets of rolling elements 4, 5, in this example balls, radially interposed between the outer race 1 and the inner races 2, 3.

The bearing unit shown herein is a standard unit of the so called I generation. However, reference to this possible field of application should not be in any way interpreted as limiting the scope of the patent, as the invention is equally applicable to bearing units with flanged races.

Formed preferably at one end of the outer race 1 is a circumferential peripheral recess 6. Bearings having a circumferential recess of this kind are currently already used, as schematically shown in FIG. 4, to allow to mount an annular cover 7 carrying a sensor 8 facing an impulse ring 9 fast for rotation to one of the rotatable inner races of the bearing. The cover 7 forms a circumferential projection 10 having a shape that matches that of the recess 6 of the outer race 1 to facilitate coupling therewith.

Still referring to FIG. 2, according to the present invention the bearing unit A is coupled to a device B for supplying pressurized air to the tire (not shown) of the wheel through the hub (not shown) on which the inner races 2, 3 of the bearing are fixed in known manner.

The device B comprises a stationary outer ring 11 and a rotatable inner ring 12. In an essentially central radial plane P there is formed an outer radial passage 13 through the outer ring 11, and one or more inner radial passages 14 through the inner ring 12. The outer passage 13 is formed between the outer cylindrical surface 20 and the inner cylindrical surface 11a of the outer ring 11. The internal passage 14 is formed between the outer cylindrical surface 12a and the inner cylindrical surface 12b of the inner ring 12.

Disposed in the annular space between the outer ring 11 and the inner ring 12 is a sealing device formed, in this example, by two separate annular sealing elements 15, 16 that are disposed axially facing one another and symmetrically with respect to the central radial plane P in which the ducts or bores 13 and 14 lie. An intermediate annular chamber 17 is so defined laterally by the sealing elements 15, 16, externally by the outer ring 11 and internally by the inner ring 12. The chamber 17 communicates and allows the passage of pressurized air through the bores 13 and 14 to further ducts and tubes (not shown) respectively interposed between the outer bore 13 and a source of pressurized air mounted on board of the vehicle, and between the inner bores 14 and the wheel tire.

The constructional features of the sealing devices 15, 16 are per se known and will not therefore be described in further detail in this specification. For the construction of the parts and elements not shown in detail, reference may therefore be made to any of the documents mentioned in the introductory part of the description. Other constructional solution may be found, for example, in U.S. Pat. No. 5,221,381, EP-521 719, U.S. Pat. No. 5,080,156, GB-2 223 207, U.S. Pat. No. 4,844,138, EP-208 540.

To improve coupling between the outer ring 11 of the device B and the outer race 1 of the bearing unit A, the outer ring 11 preferably forms an axially protruding edge 18 having a shape matching that of the recess 6 of the outer bearing race 1 and accommodated in such recess.

In the assembled condition, the outer ring 11 of the device B is stationary with the outer bearing race 1 adjacent thereto, and the inner ring 12 of the device B is fast for rotation with the adjacent rotatable inner races 2, 3 of the bearing unit A.

In the embodiment shown in FIG. 2, the duct 13 of the outer ring 11 is radial and opens on the cylindrical outer surface 20 of the ring 11 for communicating for example with a passage formed in the standard of the suspension (not shown) that houses the bearing.

In the second embodiment, shown in FIG. 3, the outer duct 113 obtained in the stationary outer ring 11 is elbow-shaped and opens on a side face 21 of the ring 11, for example in order to receive the supply of pressurized air through a conduit or a tube separate from the suspension standard.

In the third embodiment, shown in FIG. 5, the assembly consisting of the bearing unit A and the device B is coupled to a device C for detecting relative speed rotation between the bearing races. The device C, per se known, comprises a cover mounting element 7 supporting a sensor 8 and facing an impulse ring 9 secured for rotation with the inner rotatable ring 12 of the device B. The mounting cover 7 is fixed to the outer stationary ring 11 by means of an axially protruding edge 10 that is accommodated in a peripheral circumferential recess 22 formed in the outer ring 11 on the side opposite to that having the protruding edge 18.

In the fourth embodiment, shown in FIG. 6, the passage 113 formed through the outer ring 11 of device B opens on the side surface 21 of the ring 11, similarly as shown in the variant of FIG. 3. The sensor-carrying cover 7 further forms a bore 23 axially aligned with the side opening of the passage 113.

The further embodiments shown in FIGS. 7, 8, 9 and 10 differ from the preceding ones essentially for the kind of outer bearing race that is used. In FIGS. 7 to 10, the stationary outer bearing race 1 forms on one side a shoulder 24 that is made to abut against an axially inner side of the suspension standard M. The opposite end of the outer race 1 is cold formed, preferably by rolling in a per se known manner, forming an edge 25 that projects radially against the axially outer surface of the standard M so as to axially lock the bearing unit A to the suspension. The axially protruding edge 18 of the outer ring 11 of the device B is couples with the shoulder 24 of the outer race 1 of bearing unit A. Whereas the passage 13 is radial in FIG. 7, the corresponding passage 113 is elbow-shaped in FIG. 8. Two further variants, shown in FIGS. 9 and 10 are respectively similar to those of FIGS. 7 and 8, where the unit according to the invention further includes a device C for detecting rotational speed.

As will be appreciated, by virtue of the present invention pressurized air can be supplied through the hub of the wheel by using a "standard" bearing lacking air passages through its races. The variants shown in FIGS. 3, 6, 8 and 10 further allow to avoid to form air ducts through the suspension standard.

It is to be understood that the invention is not limited to the embodiments here described and illustrated which are to be considered as examples of the air-supplying device and the bearing assembly according to the invention. The invention is likely to undergo modifications as to shape and location of parts, constructional and functional details. For example, those skilled in the art will recognized that, with some modifications, the invention is equally applicable to bearing units or hub-bearing units in which the rotatable race is radially outer and the stationary race is radially inner.

What is claimed is:

1. A device for supplying pressurized air to the tire of a vehicle wheel through the wheel hub, wherein the device for supplying pressurized air is coupled to a bearing unit, said bearing unit having a non-rotatable race, and a rotatable race, the device for supplying pressurized air comprising:

a non-rotatable ring having an inner cylindrical surface and an outer surface, wherein the non-rotatable ring comprises a radially outer ring mounted adjacent the non-rotatable race, a rotatable ring having an inner cylindrical surface and an outer cylindrical surface, wherein the rotatable ring is a radially inner ring and is mounted fast for rotation with the rotatable race, at least a first air passage formed through the non rotatable ring, wherein the first air passage is formed between the outer surface and the inner cylindrical surface of the non-rotatable ring, at least a second air passage formed through the rotatable ring, wherein the second air passage is formed between the outer cylindrical surface and the inner cylindrical surface of the rotatatable ring, a sealing device interposed between the non-rotatable ring and the rotatable ring, defining an intermediate chamber communicating with said first and second air passages.

2. The device for supplying pressurized air of claim 1, wherein the outer surface of the non-rotatable ring is an outer cylindrical surface, and wherein the first air passage is a radial passage formed between the outer cylindrical surface and the inner cylindrical surface of the non-rotatable ring.

3. The device of claim 1, wherein the outer surface of the non-rotatable ring is a side surface, and wherein the first air passage is formed between the side surface and the inner cylindrical surface of the non rotatable ring.

4. The device of claim 1, wherein the non-rotatable ring forms an axially protruding portion for coupling with the non-rotatable race of the bearing unit.

5. The device of claim 1, wherein the device for supplying pressurized air is further coupled to a rotational speed detecting device, wherein the non-rotatable ring forms a seat for coupling with the rotational speed detecting device, and wherein the rotational speed detecting device detects the rotational speed of the rotatable ring.

6. A bearing assembly for the hub of a motor vehicle wheel, comprising:
the device for supplying pressurized air of claim 1, and
a bearing unit comprising rolling elements interposed between the non-rotatable race and the rotatable race.

7. The bearing assembly of claim 6,
wherein the non-rotatable ring forms an axially protruding portion for coupling with the non-rotatable race,
wherein the non-rotatable race forms a seat for coupling with said axially protruding portion of the non-rotatable ring.

8. The bearing assembly of claim 6, the bearing assembly further comprising a rotational speed detecting device detecting the speed of rotation of the rotatable ring of the device for supplying pressurized air, wherein the detecting device includes:
a sensor carried by a mounting element mounted onto the non-rotatable ring and
a pulse wheel mounted on the rotatable ring and facing the sensor.

9. The bearing assembly of claim 8,
wherein the outer surface of the non-rotatable ring is a side surface,
wherein the first air passage formed in the non-rotatable ring opens on the side surface of said non-rotatable ring, and
wherein the mounting element of the detecting device forms a third air passage communicating with said first air passage.

10. A bearing assembly for the hub of a motor vehicle wheel, comprising:
the device for supplying pressurized air of claim 1, and
a bearing unit,
wherein the bearing unit further comprises rolling elements interposed between the non-rotatable race and the rotatable race.

11. The bearing assembly of claim 10, wherein the non-rotatable ring forms an axially protruding portion for coupling with the non-rotatable race, and wherein the non-rotatable race forms a seat for coupling with said axially protruding portion of the non-rotatable ring.

12. The bearing assembly of claim 10, wherein the detecting device includes:
a sensor carried by a mounting element mounted onto the non-rotatable ring, and a pulse wheel mounted on the rotatable ring and facing the sensor.

13. The bearing assembly of claim 12, wherein the outer surface of the non-rotatable ring is a side surface, wherein the first air passage formed in the non-rotatable ring opens on the side surface of said non-rotatable ring, and wherein the mounting element of the detecting device forms a third air passage communicating with said first air passage.

14. A device for supplying pressurized air to the tire of a vehicle wheel through a wheel hub, wherein the device for supplying pressurized air is coupled to a bearing unit, said bearing unit having a non-rotatable race, and a rotatable race, the device for supplying pressurized air comprising:
a non-rotatable ring mounted adjacent the non-rotatable race,
a rotatable ring mounted fast for rotation with the rotatable race,
at least a first air passage formed through the non rotatable ring,
at least a second air passage formed through the rotatable ring,
a sealing device interposed between the non-rotatable ring and the rotatable ring, defining an intermediate chamber communicating with said first and second air passages,
wherein the device for supplying pressurized air is further coupled to a rotational speed detecting device,
wherein the non-rotatable ring forms a seat for coupling with the rotational speed detecting device, and
wherein the rotational speed detecting device detects the rotational speed of the rotatable ring.

15. The device for supplying pressurized air of claim 14, wherein:
the non-rotatable ring is a radially outer ring, and the first air passage is formed between an outer surface and an inner cylindrical surface of the first non-rotatable ring, and
the rotatable ring is a radially inner ring, and the second air passage is formed between an outer cylindrical surface and an inner cylindrical surface of the second rotatable ring.

16. The device for supplying pressurized air of claim 15, wherein the outer surface of the non-rotatable ring is an outer cylindrical surface, and wherein the first air passage is a radial passage formed between the outer cylindrical surface and the inner cylindrical surface of the non-rotatable ring.

17. The device for supplying pressurized air of claim 15, wherein the outer surface of the non-rotatable ring is a side surface, and wherein the first air passage is formed between the side surface and the inner cylindrical surface of the non-rotatable ring.

18. The device for supplying pressurized air of claim 14, wherein the non-rotatable ring forms an axially protruding portion for coupling with the non-rotatable race of the bearing unit.

* * * * *